United States Patent [19]

Mareydt et al.

[11] 4,261,496
[45] Apr. 14, 1981

[54] SKI RACK

[75] Inventors: Ray G. Mareydt, Warren; Daniel J. Kowalski, Ortonville, both of Mich.

[73] Assignee: Four Star Corporation, Troy, Mich.

[21] Appl. No.: 75,840

[22] Filed: Sep. 14, 1979

[51] Int. Cl.³ ............................................. B60R 9/12
[52] U.S. Cl. .................................... 224/315; 16/141; 224/319; 224/321; 224/917
[58] Field of Search ............... 224/315, 319, 321–327, 224/917; 16/141; 211/4, 6, 7, 60 SK

[56] References Cited

U.S. PATENT DOCUMENTS

| 1,946,837 | 2/1934 | Clayton | 16/141 |
| 2,772,824 | 12/1956 | Binding | 224/319 |
| 3,223,302 | 12/1965 | Helm | 224/319 |
| 3,273,768 | 9/1966 | Duer | 224/917 |
| 3,468,460 | 9/1969 | Wright et al. | 224/917 |
| 3,638,844 | 2/1972 | Bronson | 224/319 |
| 4,132,335 | 1/1979 | Ingram | 224/324 |

FOREIGN PATENT DOCUMENTS 2353006 4/1975 Fed. Rep. of Germany ........... 224/324

*Primary Examiner*—Stephen Marcus
*Attorney, Agent, or Firm*—Reising, Ethington, Barnard, Perry & Brooks

[57] ABSTRACT

An adjustable and removable ski rack for association with an automotive vehicle carrier is adapted to be releasably attached to a bracket slidingly positioned in a carrier track. The ski rack includes a removable key-operated lock for lockingly detachably pivoting an end of the rack to enable insertion or removal of skis. The bracket includes a disc for releasably locking the bracket anywhere along the length of the track. The disc is ratcheted in a preferred embodiment to prevent unintended loosening of the bracket and resultant movement of the bracket along the track.

6 Claims, 9 Drawing Figures

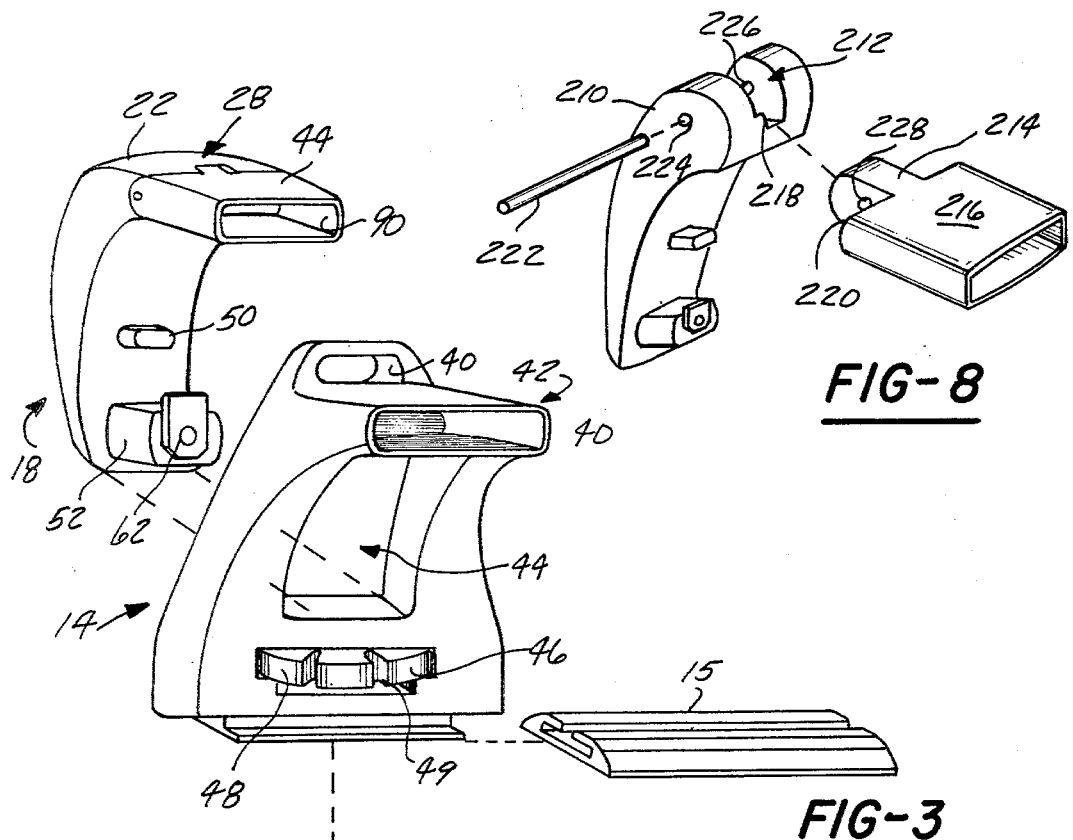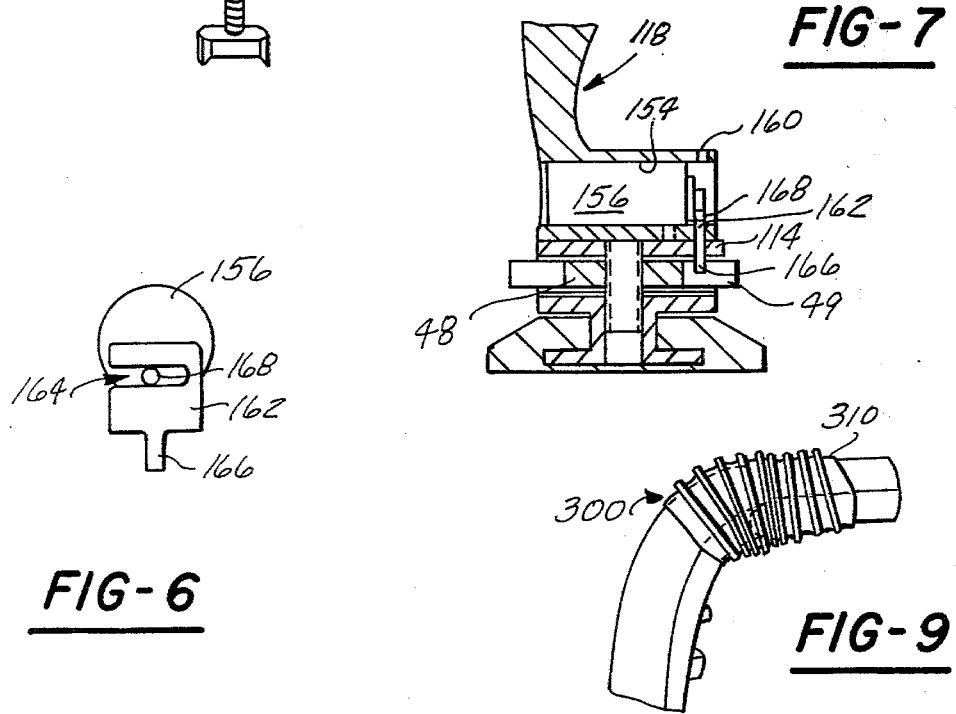

SKI RACK

BACKGROUND OF THE INVENTION

I. Field of the Invention

The present invention pertains to a ski rack configured to be releasably attached to an adjustable bracket for article carriers. More particularly, the present invention pertains to a ski rack releasably attached to an adjustably positionable bracket for vehicle-related article carriers. Even more particularly, the present invention concerns a ski rack releasably attached to an adjustably positionable bracket for vehicle-associated use as a ski rack, and having a key operated locking means that allows an end of the rack to be selectively pivoted to insert or remove skis.

II. Prior Art Statement

U.S. Pat. Nos. 3,710,998; 3,719,297; 3,897,895; and 3,920,167 disclose car top ski carriers that are releasably attached to the vehicle roof using latches which releasably grasp the rain gutter. All of the above inventions have a common characteristic of being quickly attached to and removed from the vehicle roof and being employed solely for the transport of skis.

U.S. Pat. No. 3,223,302 constitutes the closest art the Applicant's attorney has discovered relating to the present invention. U.S. Pat. No. 3,223,302 discloses a car top carrier which can be used to transport luggage or the like which has a ski carrying device affixed to front and rear cross-rails. The ski carrying device is hinged at the ends of the cross-rails and is permanently affixed to the carrier and not intended for easy removal.

The present invention, on the other hand, provides an adjustably positionable ski rack which adapts and employs the bracket and track assembly of copending U.S. patent application Ser. No. 015,327, filed Feb. 26, 1979 as well as U.S. Pat. No. 4,132,335.

The above listed United States Patents including the references of the copending application constitute the closest prior art known to the applicant.

SUMMARY OF THE INVENTION

In accordance with the present invention, there is provided a ski rack adapted to be releasably mounted to an adjustably positionable bracket for an article carrier. The bracket is positionable along a track and is prevented from unintended movement by a rotatable disc. The ski rack hereof, generally, comprises:

(a) an end member releasably mounted to a cross-rail receiving bracket;
(b) the end member comprising a lower section releasably mountable to the bracket and an upper section spaced above the bracket;
(c) a cross-rail supported by the bracket extending transversely across the vehicle;
(d) a rack-rail receiving member;
(e) a rack-rail attached to the rack-rail receiving member, the rack-rail being spaced above and extending parallel to the cross-rail;
(f) a ratcheted hinge interconnecting the rack-rail receiving member to the end member;
(g) a vertical wall extending between the rack rail and the cross-rail;
(h) a resilient member interposed the wall and the cross-rail; and
(i) a key operated end member locking means for releasably locking the end member to the bracket.

The bracket hereof generally comprises:

(a) means for variably, adjustably positioning the bracket along a track provided in an article carrier; and
(b) a rail receiving upper section.

The upper section of the bracket includes at least one opening for receiving a complementary projection of the ski rack end member for releasably securing the end member to the bracket.

For a more complete understanding of the present invention reference is made to the following detailed description and accompanying drawing. In the drawing, like reference characters refer to like parts throughout the several views, in which:

BRIEF DESCRIPTION OF THE DRAWING

FIG. 3 is a broken perspective, exploded view of the ski rack and bracket hereof and the carrier slat;

FIG. 6 is a cross-sectional view of an alternate lock means;

FIG. 7 illustrates the cam employed in the lock means of FIG. 6;

FIG. 8 illustrates an alternate device for retaining the rack in an elevated position; and FIG. 9 illustrates a boot for protecting the hinge.

DESCRIPTION OF THE PREFERRED EMBODIMENT

Figure 1:
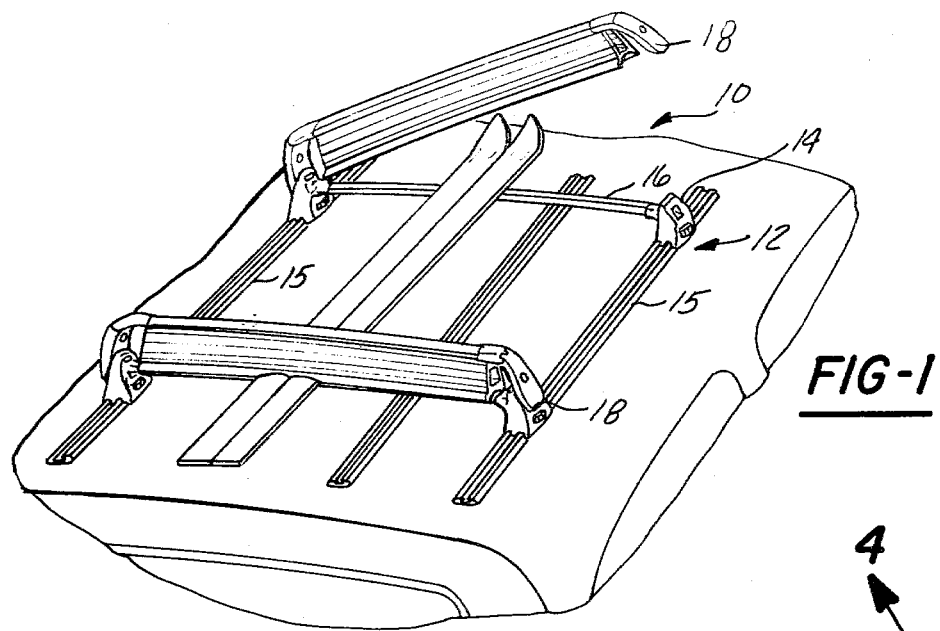
FIG. 1 is a broken perspective view of a vehicle incorporating a preferred embodiment of a ski rack in accordance with the present invention.
Figure 2:
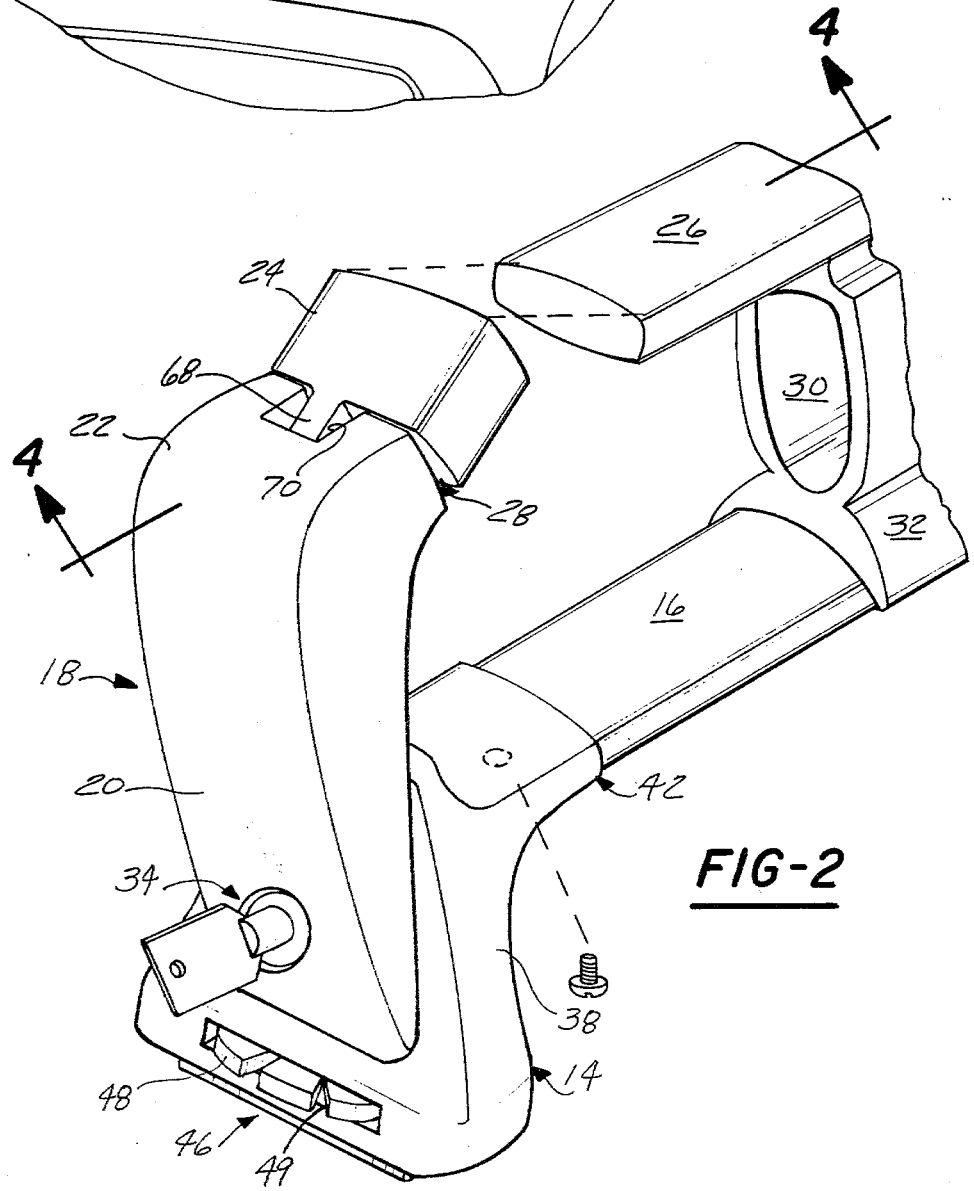
FIG. 2 is a broken perspective view of the ski rack of the present invention.

Now, and with reference to the drawing, there is depicted therein a ski rack 10 in accordance with the present invention as well as an article carrier 12 incorporating a combined ski rack and cross-rail receiving bracket 14. The bracket 14, also, supports a cross-rail 16 which defines an element of the ski rack hereof.

The ski rack hereof comprises:

(a) an end member 18 releasably mounted to the cross-rail receiving bracket 14;
(b) the end member 18 comprising a lower section 20 releasably mountable to the bracket and an upper section 22 spaced above the bracket;
(c) a rack rail receiving member 24;
(d) a rack rail 26 attached to the rack rail receiving member 24 spaced above and extending parallel to the cross-rail 16;
(e) a ratcheted hinge 28 interconnecting the rack rail receiving member to the upper section 22;
(f) a vertical wall 30 extending between the rack rail 26 and the cross-rail 16;
(g) a resilient member 32 interposed the wall and the cross-rail; and
(h) a key operated end member locking means 34 for releasably locking the end member 18 to the bracket 14.

The bracket 14 hereof, generally, comprises an adjustably positionable bracket for positioning along a track 15 disposed along a vehicle surface wherein unintended loosening and adjustment of the bracket is prevented, which includes:

(a) a base 36 for variably adjustably positioning the bracket along the track 15;

(b) an upper section 38 interconnected to the base 36, the upper section having an upper opening 40 and including a cross-rail receiving means 42 as well as a transverse opening 44 through the upper section; and (c) means 46 for releasably locking the bracket in position, the locking mechanism including a disc 48 to prevent unintended movement of the bracket.

As defined by the present invention, the article carrier 12 comprises at least one track 15 adapted to receive the cross-rail receiving bracket 14. The bracket 14 is moveable along the track 15 and releasably locked thereto by the locking means 46, in a manner described subsequently.

The ski rack hereof comprises the end member 18 releasably mounted to the rail receiving bracket 14. The end member lower section 20 abuts an outer surface of the bracket 14. The end member upper section 22 extends above the bracket and curves inward in an arcuate manner. An end member upper projection 50 projects inward from the lower section 20 and is slidingly received by the opening 40. A lower projection 52 projects inward from the lower section 20 slidingly engaging the transverse opening 44 of the bracket 14. The lower projection 52 includes a throughbore 54 configured to receive a barrel 56 of the end member locking means 34. The barrel 56 is retained by a locking screw 58 threadingly received by the projection 52 and aligned with a recess 55 in the barrel 56. A locking key 60 engages the barrel 56 for locking and unlocking the lock mechanism. A cam 62 is journalled to the lock mechanism and rotates therewith. In a first position the cam 62 overlays an inner wall 64 of the bracket to lock the end member to the bracket 14. In a second position the cam 62 is rotated out of engagement with the inner wall 64 to release the end member 18 from engagement with the bracket 14.

The end member 18 extends upward above the bracket 14 and curves inward in an arcuate manner terminating at a rack-rail receiving member 24. The rack-rail receiving member 24 is hinged to the end member upper section 22 by means of the ratcheted hinge 28.

Figure 5:
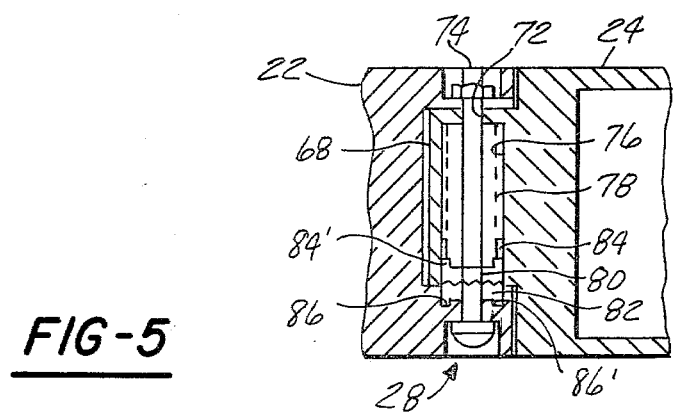
FIG. 5 is a cross-sectional view of the hinge taken along the line 5—5 of FIG. 4.

The hinge 28 comprises a hinge projection 68 slidingly received by a hinge recess 70. An aperture 72 (FIG. 5) is formed through the projection 68 and the recess 70. A bolt 74 passes through the aperture 72 to hingedly join the rack-rail receiving member 24 to the upper section 22. End portions of the projection 68 and recess 70 are shaped in an arcuate manner to form complementary abutting surfaces where the ends of the rack-rail receiving member 24 and the upper section 22 meet.

A spring bore 76 formed in the projection 68 provides a concentric space around the bolt 74 to support a biasing spring 78. A pair of serrated discs 80,82 with mating abutted serrated faces are biased together by the spring 78. The serrated discs 80,82 each include a registering central bore which slidingly engages the bolt 74 and centers the discs with the spring bore 76. The disc 80 is slidable in the bore 76. A first pair of longitudinal projections 84,84' disposed an outer diameter edge of the disc 80 to engage a complementary recess in the bore 76. The longitudinal projections and the recess cooperate to allow the disc 80 to be slid in the bore 76 but retained for rotation with the hinge projection 68. A second pair of projections 86,86' formed along an outer diametral edge of the disc 82 engage a complementary recess in the end member 18 to allow the disc 82 to abut the end member 18 and be retained thereby against rotation.

Rotation of the rack-rail receiving member 24 forces relative rotation of the mating abutting serrated discs 80,82. The rotation forces the disc 80 to move longitudinally against the biasing spring 78 and out of mating abutment with the serrations of the disc 82. Further relative rotation of the discs again moves the serrations into mating alignment and the biasing spring 78 moves the disc 80 into abutment with the disc 82. The intermittent engaging and disengaging of the serrations as rotation of the hinge occurs, results in a ratcheting action or incremental movement of the ratcheted hinge 28. The ratcheted hinge 28 allows the rack-rail to be hinged above the cross-rail and held in position against gravity. This allows the user of the ski rack to raise the rack-rail above the cross-rail and use both hands to position skis on the cross-rail. Hence, the rack-rail and cross-rail cooperate to enable racking of the skis therebetween. It is to be appreciated that other means may be employed for positioning the rack-rail above the cross-rail such as a pair of spring biased discs or other friction devices.

As heretofore noted, the track 15 receives the bracket 14. The bracket 14 comprises (a) the base section 36 for adjustably positioning the bracket along the extent of the track 15, (b) an upper section 38 integral with the base, and (c) means 46 for releasably locking the bracket in position. The bracket 14 hereof, also, comprises means 42 for detachably mounting cross-rail 16 thereto. The bracket upper section also comprises the upper opening 40 for receiving the upper projection 50 of the end member. Typical locking means for the bracket 14 is more completely described in U.S. Pat. No. 4,132,335 as well as in copending application. U.S. patent application Ser. No. 015,327, filed Feb. 26, 1979, the disclosure of which is hereby incorporated by reference.

Generally speaking, the locking means 46 comprises a key 88 and the rotatable disc 48 threadably interconnected to the key. The locking mechanism functions by implacing the bracket in the track and sliding same to the desired position. Thereafter, the disc is rotated in a first direction urging the key into engagement with a wall of the track. This wedges and locks the bracket to the track. Rotation of the disc in an opposite direction withdraws the key from engagement with the track freeing the bracket for movement along the track.

Figure 4:
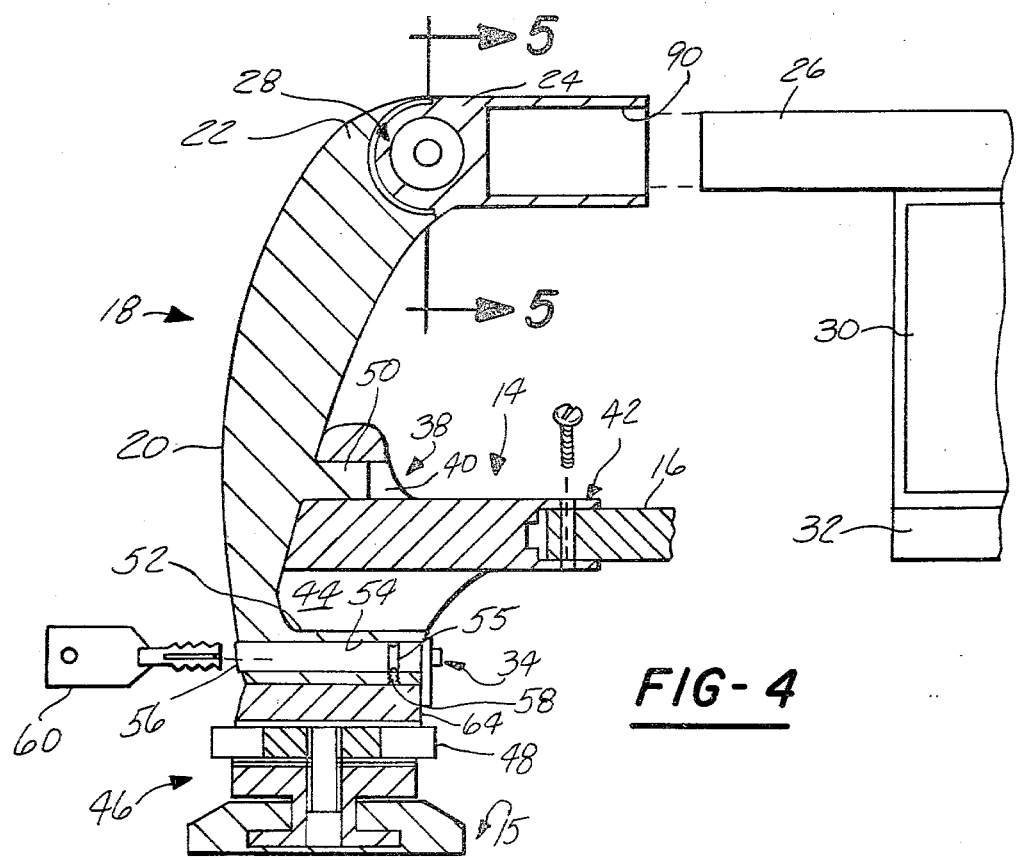
FIG. 4 is a cross-sectional view of the ski rack hereof taken along line 4—4 of FIG. 2.

Referring again to the drawing and in particular to FIG. 4, the rack-rail receiving member 24 supports a rack-rail 26 by means of a female opening 90 which snugly receives the rack rail 26. A vertical wall 30 is affixed to the rack rail 26 and extends downward to a point just above the cross-rail 16 filling a space between the rack-rail 26 and the cross-rail 16. The resilient member 32 is sandwiched between a bottom end of the vertical wall 30 and the rail 16 to retain skis therebetween.

To utilize the ski rack as described hereinabove, a pair of bracket supported cross-rails 16 are spaced along a pair of longitudinal tracks 15 affixed to the surface of the vehicle and locked into position by the locking means 46. A pair of ski racks are affixed to each of the pairs of brackets supporting the rails 16 and locked in place utilizing the locking means 34 and the locking key 60. The end members 18 are released at one side from engagement with the brackets 14 by rotating the key lock 34 to the unlocked position. The racks can then be elevated upward a distance against the ratchet. The skis are placed longitudinally atop the rails 16 and the rack is ratcheted downward to have the end members 18 engage the brackets 14 and are locked in place by rotating the key lock 34 to the locked position.

Referring again to the drawings and in particular to FIGS. 6 and 7 there is illustrated an alternate embodiment for locking an end member 118 to a bracket 114. A lock means 134 comprises a barrel 156 slidingly engaging a bore 154 in the end member 118. The barrel 156 is retained within the end member 118 by a lock screw 58 which threadingly engages a threaded bore in communication with the bore 154 and tightening the lock screw 58 abuts the lock screw against the barrel 156. A pin 168 at an inner end of the barrel 156 is off-set from an axis of the barrel, and engages a cam 162 in a manner which will be described subsequently. A slot 160 formed in the end member 118 slidingly positions the cam 162 allowing vertical movement. The cam 162 comprises a thin planar member made from hardened steel which includes a notch 164 extending horizontally into the cam to slidingly engage the pin 168. A projection 166 which projects centrally downward from the cam, selectively engages one of a plurality of radial slits 49 formed in the disc 48. When the projection 166 engages the slit 49 the disc 48 is locked against rotation locking the bracket 114 in position.

The barrel 156 is rotatable from a first position wherein the cam 162 engages the slit 49 and a vertical slot 161 formed in the bracket 114 to lock the disc 48 against rotation and to retain the end member 118 against the bracket 114, to a second position wherein the pin 168 cooperating with the slot 164 moves the cam 162 upward disengaging the projection 166 from the slit 49 and the vertical slot 161 allowing the end member 118 to be removed from engagement with the bracket 114 and the bracket 114 to be selectively moved along the track 15.

A boot, (not shown), made from flexible material such as rubber, may abut an outer surface of the end member 118. The boot affixed to the end member by a drive screw passing through an opening formed in the boot and drivingly engaging an aperture formed in the end member 118 squeezing the boot between the end member and a head of the drive screw. A circular projection may be used to snugly engage the bore 154 to seal the lock means against moisture. A tab may be employed to move the boot away from the end member and allow access to the lock.

Referring now to FIG. 8 of the drawings, there is illustrated at 200 an alternate device for selectively positioning the rack above the cross-rail for the insertion or removal of skis. An end member 210 comprises an opening 212 for pivotally receiving a tongue 214 of a rack receiving member 216.

A pin 222 snugly engages a pair of aligned apertures 224,226 formed in the end piece 210. The pin 222 traverses the opening 212 and slidingly engages an aperture 228 formed in the tongue 214 to form a pivot.

A ledge 218 formed adjacent the opening may selectively support a bottom wall 220 of the tongue 214 when it has been pivoted to a position above the ledge 218 and moved axially along the pin 222 to be positioned over the ledge.

To lower the rack the tongue is slid to the side away from the ledge 218 and the rack receiving member 216 is allowed to pivot toward the rail.

Referring to FIG. 9 of the drawings, there is illustrated at 300 a bellows type rubber boot 310 that is employed to cover the pivot or hinge. The boot protects the hinge from ice and moisture to prevent corrosion or a freezing up of the hinge with ice or snow.

It is to be appreciated that there has been described herein a ski rack releasably fastenable to a bracket of an article carrier. The bracket can be readily locked in any desired position along a track disposed along a surface of the vehicle. The ski rack is fastened to the bracket by means of a key actuated locking means which prevent unauthorized removal of the skis or the rack.

It should be further appreciated that there has been described herein a ski rack that is releasably attachable to any bracket or stanchion, movable or fixed, of an article carrier. The criticality of the invention being that the bracket or stanchion be configured to receive the ski rack end member.

Having thus described our invention what is claimed is:

1. A ski rack in combination with an article carrier for an automotive vehicle of the type comprising an elongated slat, the elongated slat having a longitudinally extending track formed therein, a rail receiving bracket therefor including an opening, the ski rack comprising:
   an end member with a projection to slidingly engage the opening;
   a key operated locking means with a cam journalled thereto rotatable by a removable key between a first position and a second position, whereby in the first position the cam engages the bracket to lockingly retain the end member thereto and in the second position the end member is released from locking engagement with the bracket;
   the bracket including a base section engageable with the track formed in the slat, the base being slidable along the extent of the track;
   an upper section interconnected to the base section and disposed above the slat;
   a rotatable disc mounted onto the bracket;
   means for selectively locking the bracket in the track responsive to rotation of the disc;
   a cross-rail attached to the rail receiving bracket;
   a rack-rail receiving member spaced above the cross-rail and hinged to the end member;
   a rack-rail attached to the rack receiving member;
   a hinge ratcheted to selectively hold the rack-rail in a plurality of positions;
   a vertical wall extending from the rack-rail to a point above the cross-rail; and
   a resilient member interposed between the vertical wall and the cross-rail.

2. A ski rack in combination with an article carrier for an automotive vehicle of the type comprising an elongated slat, the elongated slat having a longitudinally extending track formed therein, a rail receiving bracket therefor including an opening, the ski rack comprising:
   an end member with a projection to slidingly engage the opening;
   a key operated locking means including a barrel rotatable by a removable key between a first position and a second position, a pin off-set from the barrel axis, a slot formed in the end member, a vertical slot formed in the bracket aligned with the slot, a cam slidingly engaging the slot and the vertical slot, a horizontally extending notch formed in the cam engaging the pin, a projection integral with the cam extending downward therefrom, whereby in the first position the cam engages the vertical slot to lockingly retain the end member to the bracket and in the second position the end member is released from locking engagement with the bracket;

the bracket including a base section engageable with the track formed in the slat, the base being slidable along the extent of the track;

an upper section interconnected to the base section and disposed above the slat;

a rotatable disc including a plurality of radial slits mounted onto the bracket;

means for selectively locking the bracket in the track responsive to rotation of the disc; and wherein the locking means is in the first position the projection engages one of the radial slits locking the disc against rotation.

3. A ski rack in combination with an article carrier for an automotive vehicle of the type comprising an elongated slat, the elongated slat having a longitudinally extending track formed therein, a rail receiving bracket therefor including an opening, the ski rack comprising:

(a) an end member having upper and lower portions, the lower portion of said end member including an integral projection slidable within the bracket opening, (b) a rack-rail, (c) means for hingedly connecting said rack-rail to the upper end of said end member allowing said rail to pivot about the end member when said projection is within the bracket opening;

(d) locking means including a cam rotatable between a first position and a second position whereby in the first position the cam engages the bracket to lockingly retain the end member thereto and in the second position the end member is released from locking engagement with the bracket;

the bracket including (a) a base section engageable with the track formed in the slat, the base being slidable along the extent of the track;

(b) an upper section interconnected to the base section and disposed above the slat;

(c) a cross-rail mounted to said bracket in parallel and subadjacent relationship to said rack-rail whereby said rack-rail and said cross-rail are adapted to coact to clampingly retain a removable member therebetween;

(d) a rotatable disc mounted on the bracket; and (e) means for selectively locking the bracket in the track responsive to the rotation of the disc.

4. A ski rack as set forth in claim 3 wherein the hingedly connecting means includes a spring biased means adapted to retain said rack-rail in a plurality of positions relative to said cross-rail.

5. A ski rack releasably mounted to a bracket of an article carrier, the ski rack comprising:

(a) a cross-rail attached to the bracket;

(b) an end member releasably attached to the bracket;

(c) a rack-rail receiving member;

(d) a hinge means connecting the rack-rail receiving member to the end member;

(e) a rack-rail attached to the rack receiving member;

(f) means for releasably pivoting an end of the rack-rail in a plurality of positions relative to said cross-rail, said releasable means comprising:

(1) first and second serrated discs, said discs releasably interlocking at their serrations and disposed along the axis of said hinge, and (2) means biasing the discs into engagement at the serrations.

6. A ski rack as set forth in claim 5 wherein the rack receiving member includes a bore concentric with said hinge axis, said first serrated disc being axially slidable within said bore and rotatable with the rack receiving member, said end member including a bore coaxially aligned with the bore in said rack receiving member, said second disc being retained against rotation in the bore of said end member, said biasing means urging said first serrated disc into engagement with said second serrated disc whereby said rack-rail may be retained in a plurality of positions relative to said cross-rail as said rack-rail is rotated upwardly relative to said end member.

* * * * *